Patented May 4, 1926.

1,583,662

UNITED STATES PATENT OFFICE.

CARL SUNDSTROM AND GEORGE N. TERZIEV, OF SYRACUSE, NEW YORK, ASSIGNORS TO THE SOLVAY PROCESS COMPANY, OF SOLVAY, NEW YORK, A CORPORATION OF NEW YORK.

PROCESS OF FORMING SODIUM COMPOUNDS.

No Drawing. Application filed November 8, 1923. Serial No. 673,468.

*To all whom it may concern:*

Be it known that we, CARL SUNDSTROM and GEORGE N. TERZIEV, citizens of the United States, residing at Syracuse, in the county of Onondaga and State of New York, have invented certain new and useful Improvements in Processes of Forming Sodium Compounds, of which the following is a specification.

Our invention relates particularly to the production of the sodium bicarbonate-carbonate compound to which has been given the formula $$Na_2CO_3.3NaHCO_3$$

and which is characterized by its fine needle-like crystal form and its refractive indices $\alpha=1.435$ and $\gamma=1.526$.

This substance has heretofore been formed by heating sodium bicarbonate or a suitable bicarbonate-carbonate mixture at a preferred temperature of about 100° C., the reaction material containing some water. When the preferred temperature of about 100° C. is used the reaction takes place at a satisfactory rate, but an impure product containing sodium carbonate is often obtained. This is due possibly to the rapid loss of the water content from the reaction material, which, when dry, no longer reacts to give the desired product, and to the decomposition of sodium bicarbonate present into the carbonate. On the other hand, when a lower temperature is used, the reaction takes place very slowly, especially when sodium bicarbonate without any admixture of carbonate is employed.

We have now discovered, and our invention is based on the discovery, that these difficulties can be overcome and the conversion of the sodium bicarbonate material into the desired compound can be readily and quickly effected and a product of a high degree of purity obtained by maintaining, in contact with the reacting materials a steam or water vapor atmosphere during the heating operation. Under these conditions it is not necessary that the initial reaction mixture should contain water and a heating temperature substantially above 100° C., can be used thereby materially increasing the rate of formation of the desired product.

The maintenance of the desired steam or water vapor atmosphere may be effected in various ways. Thus the water vapor evolved or generated during the heating of a moist reaction material may be prevented from escaping at once from the system and retained in the reaction vessel, or water may be added at intervals to the reacting material, or a flow of steam or water vapor may be passed through the vessel from some outside source. This latter method has the further advantage that it provides the necessary heat and automatically maintains the desired temperature since a current of steam will supply heat and at the same time will automatically maintain a constant temperature corresponding to its pressure.

Ordinary low pressure steam, for example, will produce and maintain the preferred operating temperature of about 100° C. Heating by means of a current of steam is also of advantage in that the heating medium comes into direct and intimate contact with all the material and not with a limited portion as is the case with external heating.

The following examples from experiments performed by us will serve to indicate these and other advantages of our process.

*Example I.*—Two wide mouthed liter bottles were filled with crude sodium bicarbonate of the ammonia soda process (about 13% water content). One bottle was closed with a cork, through which passed a piece of glass tubing of capillary bore. The other bottle was merely provided with a piece of cotton over the mouth. The bottles were heated in an air bath for four days at 105°–110° C. with constant rotation. Temperature readings taken in the bottles indicated that the temperature during the first day was below 100° C. and for the remaining three days 100–102° C. in the corked bottle, and 102°–105° in the open bottle. Analysis and microscopic examination of the content of the corked bottle indicated about 50% conversion into $$Na_2CO_3.3NaHCO_3$$

at the end of the second day and practically complete conversion into the desired compound at the end of the fourth day. Microscopic examination of the content of the open bottle showed only about 20% of the desired compound and a considerable amount of sodium carbonate.

*Example II.*—A mixture of dry sodium bicarbonate and the monohydrate of sodium carbonate (85% $Na_2CO_3$ by analysis) was made such that the composition of the mixture was represented by the analysis $NaHCO_3=66.6\%$, $Na_2CO_3=28.4\%$, water about 5%. A liter bottle was half filled with this material, closed with a cork having a capillary opening and heated as in Example I for two days in an air bath at 105° C. The resultant product which completely filled the bottle showed the slender and elongated crystal form characteristic of the desired compound. Microscopic examination indicated over 80% conversion together with some unconverted bicarbonate and sodium carbonate.

*Example III.*—A mixture of three parts by weight of crude sodium bicarbonate of the ammonia soda process and one part by weight of sodium carbonate was made. The composition of the mixture was represented by the analysis $NaHCO_3: 63.2\%$, $Na_2CO_3$ 29.1%, and water about 7.5%. A liter bottle was filled half full with this mixture, closed with a cork and capillary and heated as in Example I in an air bath at 92° C. (Temperature in bottle 87° C.) Considerable increase in volume took place within the first few hours, indicating that the reaction was proceeding rapidly. At the end of 24 hours the product completely filled the bottle and consisted of the characteristic thin, elongated, needle-like crystals. Microscopic examination indicated practically complete conversion.

*Example IV.*—Dry refined sodium bicarbonate was placed in a shallow dish and heated in a current of steam at 13–14 lbs. pressure. (Temperature about 120° C.) The dish was covered loosely. The bicarbonate was transformed into a relatively solid and dense mass formed by the coalescence of the characteristic needle-like crystals of the desired compound. Microscopic examination indicated about 50% transformation in five hours and about 80% in six hours.

*Example V.*—A liter bottle was filled with crude sodium bicarbonate of the ammonia soda process, (water content about 13%), closed with a cork and capillary and heated in an air bath as in Example I at a temperature of 122° C. At the end of 24 hours the temperature in the bottle was about 114° C. and the product consisted mainly of the desired compound with a small amount of unchanged bicarbonate.

For practical purposes the relative times of reaction indicated in these examples can be greatly shortened by agitating or stirring the material during the heating operation, for example, by passing the material through a large rotating horizontal cylinder, provided with stirring or agitating devices or downward through an apparatus provided with horizontal trays and scrapers similar, for example, to the furnaces used for roasting iron sulfide ores. On the other hand, if large and well defined crystals are desired it is advisable to carry out the reaction slowly and with minimum disturbance of the reaction mixture, for example, by filling a vessel, such as a steam digester with the material and maintaining an atmosphere of steam therein at a pressure slightly above atmospheric.

By means of our invention we obtain the desired product more rapidly and in a state of greater purity than heretofore and in the form of large, well defined crystals. The use of a higher range of temperature than has heretofore been possible is also permissible and thus the danger of breaking down the formed product into sodium carbonate by overheating is avoided, advantages which will be readily apparent to those skilled in the art.

When in the claims we speak of the compound $$Na_2CO_3.3NaHCO_3,$$

we mean the product discovered by Herbert Edwin Cocksedge and described in his U. S. patent application, Serial No. 598,020, filed October 30, 1922, and which is characterized by its fine, needle-like crystal form and its distinctive refractive indices of α about 1.435 and γ about 1.526, and when we speak of "steam" or "water vapor" we do not intend to limit ourselves to a gas which is composed wholly of water in the gaseous state. There may be other ingredients present such as carbon dioxide or air and we mean to include such mixtures when we use the word "steam" or "water vapor".

We also wish it understood that when in the claims we speak of "sodium bicarbonate" we mean to include suitable bicarbonate-carbonate mixtures, such as have been hereinbefore indicated, which can be substituted for the simple bicarbonate.

What we claim as new and desire to secure by Letters Patent is:—

1. In the art of forming the substance $$Na_2CO_3.3NaHCO_3$$

by heating material containing sodium bicarbonate, that improvement which consists in maintaining an atmosphere containing water vapor in effective contact with the bicarbonate continuously throughout the formation period of $$Na_2CO_3.3NaHCO_3$$

2. In the art of forming the substance $$Na_2CO_3.3NaHCO_3$$

by heating material containing sodium bicarbonate, that improvement which consists in causing the whole of the reactions involved in the formation of the said $Na_2CO_3.3NaHCO_3$ to take place in the presence of a moist atmosphere constantly maintained in intimate contact with the reaction material.

3. In the process of forming the substance $Na_2CO_3.3NaHCO_3$ by heating crude sodium bicarbonate of the ammonia soda process that improvement which consists in maintaining evolved water vapor in contact with the bicarbonate continuously throughout the formation period of said $Na_2CO_3.3NaHCO_3$ 4. In the process of forming the substance $Na_2CO_3.3NaHCO_3$ by heating sodium bicarbonate material containing some moisture, that improvement which consists in maintaining evolved water vapor in contact with bicarbonate continuously throughout the formation period of said $Na_2CO_3.3NaHCO_3$ and supplementing the water vapor of said atmosphere during the said period by the addition of steam.

5. The process of forming the substance $Na_2CO_3.3NaHCO_3$ which consists in heating sodium bicarbonate material and, by maintaining an atmosphere containing water vapor in effective contact with the bicarbonate material continuously throughout the formation period of $Na_2CO_3.3NaHCO_3$ permitting only a limited amount of carbonic acid gas to pass off from said bicarbonate, and causing a reaction between the changed and the unchanged bicarbonate, to take place until the desired substance is formed.

In testimony whereof we affix our signatures this 31st day of October, 1923.

CARL SUNDSTROM.
GEORGE N. TERZIEV.